(12) United States Patent
Danielson et al.

(10) Patent No.: US 6,993,017 B1
(45) Date of Patent: Jan. 31, 2006

(54) SWITCH APPARATUS

(75) Inventors: Magnus Danielson, Stocksund (SE); Joachim Roos, Nacka (SE)

(73) Assignee: Net Insight AB, Stockholm (SE)

(*) Notice: Subject to any disclaimer, the term of this patent is extended or adjusted under 35 U.S.C. 154(b) by 0 days.

(21) Appl. No.: 10/009,553

(22) PCT Filed: May 3, 2000

(86) PCT No.: PCT/SE00/00850

§ 371 (c)(1),
(2), (4) Date: Mar. 21, 2002

(87) PCT Pub. No.: WO00/70904

PCT Pub. Date: May 4, 1999

(30) Foreign Application Priority Data

May 4, 1999 (SE) .................................. 9901607

(51) Int. Cl.
*H04L 12/50* (2006.01)
*H04J 3/06* (2006.01)

(52) U.S. Cl. ...................... 370/369; 370/375; 370/503
(58) Field of Classification Search ............... 370/360, 370/369, 370, 372, 373, 375, 376, 380, 386, 370/387, 503, 506, 536, 545
See application file for complete search history.

(56) References Cited

U.S. PATENT DOCUMENTS

| | | | | |
|---|---|---|---|---|
| 5,365,511 A | * | 11/1994 | Kusano | 370/220 |
| 5,369,400 A | * | 11/1994 | Bowdon | 340/2.22 |
| 5,864,552 A | * | 1/1999 | Du et al. | 370/388 |
| 5,978,370 A | * | 11/1999 | Shively | 370/370 |
| 6,470,011 B1 | * | 10/2002 | Tanimura et al. | 370/369 |
| 6,693,902 B1 | * | 2/2004 | Sahlman et al. | 370/369 |
| 6,693,903 B1 | * | 2/2004 | Shively | 370/370 |

FOREIGN PATENT DOCUMENTS

| | | |
|---|---|---|
| SE | 9704067-9 | 5/1999 |
| WO | WO 9403021 A1 | 2/1994 |
| WO | WO 9532599 A2 | 11/1995 |
| WO | WO99/25099 | 5/1999 |

OTHER PUBLICATIONS

Cheung, K.Y. and Wong, P.C., "BMSN and SpiderNet as large scale ATM switch interconnection architectures," IEEE International Conference on Communications—Towards the Knowledge Millennium 472-77 (Montreal, Jun. 8-12, 1997).

Bohm et al., *The DTM Gigabit Network*, 3 Journal of High Speed Networks 109-26 (IOS Press, 1994).

* cited by examiner

*Primary Examiner*—Chau Nguyen
*Assistant Examiner*—Soon D. Hyun
(74) *Attorney, Agent, or Firm*—Finnegan, Henderson, Farabow, Garrett & Dunner L.L.P.

(57) ABSTRACT

The present invention refers to an apparatus for time and space switching data from a first and a second input signal to a first and a second output signal, said apparatus comprising at least four switch elements, each having a first and second input port and an output port. Each one of the switch elements comprises switching means arranged to provide for time-switching of data received from said first input port to provide an output referring to said output port and selecting means for defining a signal to be outputted from said output port by selectively combining said output from said switching means and data received via said second input port, the mutual order of said data received via said second port being the same when incorporated into said signal as when received via said input port.

10 Claims, 6 Drawing Sheets

SWITCH APPARATUS

TECHNICAL FIELD AND BACKGROUND OF THE INVENTION

The present invention refers the field of data and telecommunications, and more specifically to an apparatus in which a number of switch elements are combined into forming a larger scale switch.

When designing and operating communication networks and components, there are many situations in which scalability when it comes to switching capacity and flexibility is of great advantage. The option of handling smaller switch elements that, if necessary or desired, may be combined into forming larger switches with greater capacity allows greater design freedom and simplifies product logistics.

When for example using a 4×4 (4 input ports and 4 output ports) switch element as building block, an 8×8, as wll as a 16×16 or 32×32 switch can be built based thereupon. Thus, instead of designing, producing, and logistically handling and supporting four different swtch architectures, only one scaleable architecture would require such attention.

Similarly, scalability when operating products in larger networks has the advantage of lowering operating cost and simplifying design and operation as one product can be configured for use in many different situations having different switching requirements.

A disadvantage with prior art schemes for combining switch elements into forming lager scale switches is that they a) often require complex interconnecting and configuration schemes, b) require internal modification of the individual switch elements, or c) do not combine the individual switch element into a switch that offers non-blocking operation.

SUMMARY OF THE INVENTION

An object of the invention is to provide a switch architecture in which a number of switch elements are combined into forming a larger scale switch and in which interconnections and configurations of the switch elements are simple, requires little or no internal configuration of the individual switch elements, and results in a switch that offers non-blocking operation.

This and other object are achieved by the invention as defined in the accompanying claims.

The invention is based upon the use of a switch element in which the relationship between an output port and each one of one or more input ports thereof is such that time-switching is performed, according to switch instructions provided by a control unit, with respect to one or more slots that are received at the respective input port and that are to be switched to the output port, and in which the relationship between said output port and an additional input port is such that no time-switching is performed with respect to slots that are received at said additional input port and that are switched to said output port.

Furthermore, the invention defines ways in which switch elements of this kind are to be interconnected to form larger scale switches, using said additional port as means for interconnecting the switch elements. Typically, said additional port is used to receive an input from another switch element, said input already having been at least time-switched by said another switch element.

According to a preferred embodiment, each switch element comprises, for each one of said one or more in put ports, a second additional output port, referred to as repeat port, wherein data received at the respective one of said one or more input ports is transmitted from the respective repeat port as received at the respective input port, thereby making it possible to provide an input signal to several switch elements by connecting them in series using said repeat port.

According to another preferred embodiment, the switch elements of the invention are arranged to receive and transmit data in essentially equally sized, e.g. 125 μs, frames, said frame typically being divided into fixed size, e.g. 64-bit, time slots. Furthermore, the data transfer within and between the switch elements that form a larger scale switch according to the invention is also preferably performed in the context of frames of data. For example, the invention will be applicable for building switches in so-called DTM (Dynamic synchronous Transfer Mode) networks. For further information on such a network, reference is made to "The DTM Gigabit Network", Christer Bohm, Per Lindgren, Lars Ramfelt, and Peter Sjödin, Journal of High Speed Networks, 3(2):109–126, 1994.

To further exemplify and describe a preferred way in which time and, optionally, space switching is performed in said switch element with respect to said one or more input ports, reference is made to the not yet published Swedish Patent Application 9704067-9.

The above mentioned features, embodiments and aspects of the invention will now be further exemplified with reference to the accompanying drawing.

BRIEF DESCRIPTION OF THE DRAWINGS

Exemplifying embodiment of the invention will now be described with reference to the accompanying drawings, wherein.

DETAILED DESCRIPTION OF PREFERRED EMBODIMENT

Figure 1:
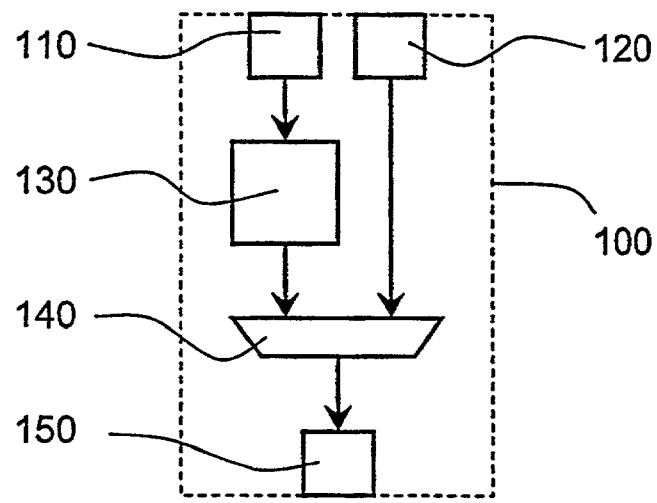
FIG. 1 schematically shows an embodiment of a switch element of the kind used to build larger scale switches according to the invention.

An exemplifying embodiment of a switch element of the kind used to build larger scale switches according to the invention will now be describe with reference to FIG. 1. In FIG. 1, the switch element 100 comprises a first input port 110, a second input port 120, a time-switching circuit 130, a selecting multiplexor 140, and an output port 150.

In operation, the first input port 110 will typically be connected to receive data in essentially fixed sized frames that are divided into fixed sized slots. For exemplifying purposes, it will throughout the drawings be assumed that the frame length is 125 μs and that each slot comprises 64 bits of data. The frames received via the input port 110 are forwarded to the time-switching circuit 130. The time-switching circuit 130 is arranged to provide for time-switching of the slots of each received frame, in accordance with time-switching instructions provided by a switching control unit (not shown), to provide an output frame of slots to the selecting multiplexor 140. An example on the design of the time-switching circuit will be described more in detail below with reference to FIG. 2.

In parallel, the second input port 120 will optionally be connected to receive data in similar, essentially fixed sized frames. However, the frames of data that are received via the second input port 120 are forwarded directly to the selecting multiplexor 140, i.e. with the time sequential order of the slots of each frame maintained.

Consequently, if both input ports of the switch element 100 are connected to receive frames of data, the selecting multiplexor will simultaneously be provided with a) frames from the time-switching circuit 130, the slots of the frames having been time-switched as compared to their locations in the frames when received at the input port 110, and b) frames from the second input port, the time slots thereof not having been time-switched.

The selecting multiplexor 140 is arranged to output frames that are to be transmitted from the output port 150 of the switch element 100 by selectively, in accordance with switching instructions provided by the above-mentioned switching control unit, combining slots of frames received from the time-switching circuit 130 with slots of frames received directly from the second input port 120. In the exemplifying embodiment illustrated in FIG. 1, the selecting multiplexor 140 is arranged to select, for each slot forwarded to the output port 150, either a slot received from the time-switching circuit 130 or a slot received from the second input port 120. More specifically, as the n:th time slot of a frame that is currently forwarded to the output port 150, the selecting multiplexor 140 will select either the n:th slot of the frame that is currently received from the time-switching circuit 130 or the n:th slot of the frame that is currently received from the second input port 120. To be noted, if the second input port 120 is not connected to receive any input signal, the selecting multiplexor will be instructed to simply forward the entire frames of slots as received from the time-switching circuit 130.

As will be illustrated more in detail below, when combining the switch element 100 with additional similar switch elements to build a larger scale switch, the first input port 110 will typically be connected to receive an input signal of the larger scale switch and the second input port 120 will be either not connected to receive any signal at all or connected to an output port of another switch element forming the larger scale switch. Consequently, an input port having a non time-switching function and being used to provide for connection to output ports of other switch elements of a larger scale switch, like the input port 120, will sometimes be referred to below as a cascade input port.

An example on the design of the time-switching circuit 130 shown in FIG. 1 will now be described with reference to FIG. 2.

Figure 2:
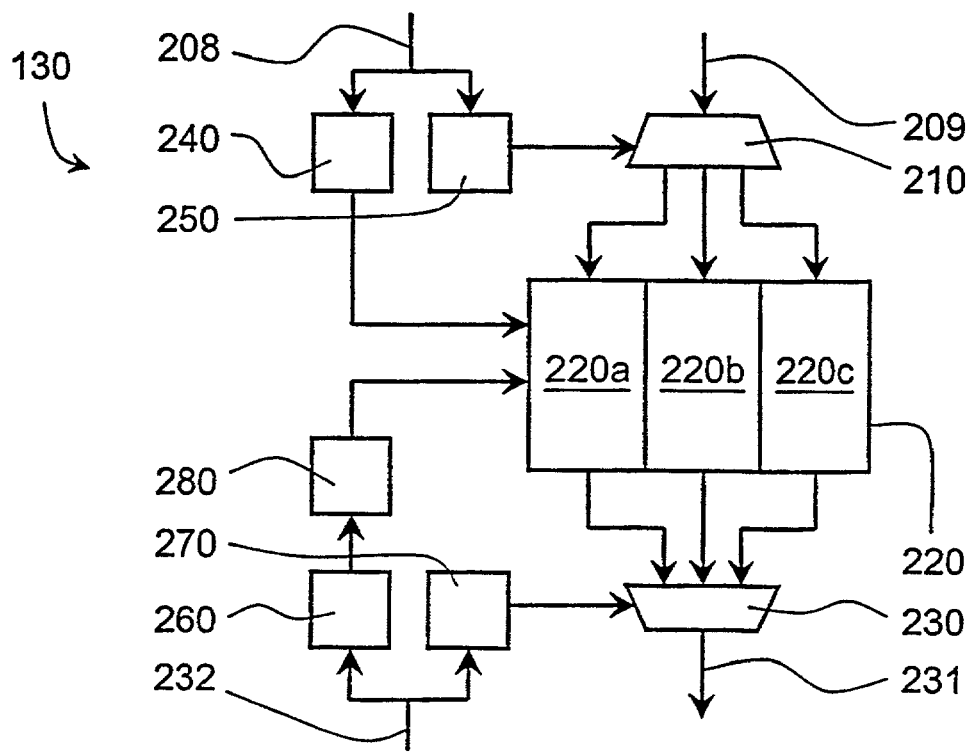
FIG. 2 schematically shows an example on the design of the time-switching circuit illustrated in FIG. 1.

In FIG. 2, the time-switching circuit 130 is arranged to perform time-switching with respect to slots of frames received as input 209 (from port 110 in FIG. 1) to provide output frames as output 231 (to port 150 in FIG. 1). The input frames 209 are provided to a demultiplexor 210. At the same time, a frame synchronization signal 208, which defines the start of each frame received as input 209, synchronizes the operation of an input slot counter 240 and a write buffer selecting unit 250. The write buffer selecting unit 250 is arranged to control the demultiplexor 210, at the rate of the frame synchronization signal, to have it forward each frame of the input 209 sequentially to one of three frame buffers 220a, 220b, and 220c of a frame memory 220 in a modulo-3 fashion. At the same time, the input slot counter 240 controls which entry of the buffer that each specific slot of the frame is written into. The input slot counter 240 is reset on each reception of the frame synchronization signal 208 and counts, at the rate of a slot frequency, from a first entry to a last entry of the buffer in sequential order, the slots of each frame thereby being written into the frame buffer to be located therein with maintained sequential slot order.

On the output side, an output frame synchronization signal 232 is used to synchronize operation of an output slot counter 260 and a read buffer selecting unit 270. The output slot counter 260 is reset on each reception of the output frame synchronization signal 232 and counts, at the rate of a slot frequency, to address a first entry to a last entry of a slot mapping table 280 (which may be said to in part form the above-mentioned switching control unit) in sequential order, thus stepping through the slot mapping table once for each output frame. For each specific output slot, the output slot counter 260 will point at a respective entry of the slot mapping table 280. The slot mapping table 280 in turn provides, at each entry, a respective address to the frame memory 220, designating from which entry thereof that slot data is to be retrieved. The entries of the slot mapping table 280 thus define the desired time-switching of the input frame. At the same time, the read buffer selecting unit 270 controls, via the multiplexor 230, from which one of the three frame buffers 220a, 220b, and 220c that slot data is currently to be forwarded, stepping through the three buffers in a modulo-3 fashion at the rate of the output frame synchronization signal 232. As is understood, the function of the write and read buffer selection units 250 and 270 is to make sure that a stored frame is not overwritten until it has been properly read.

Figure 3:
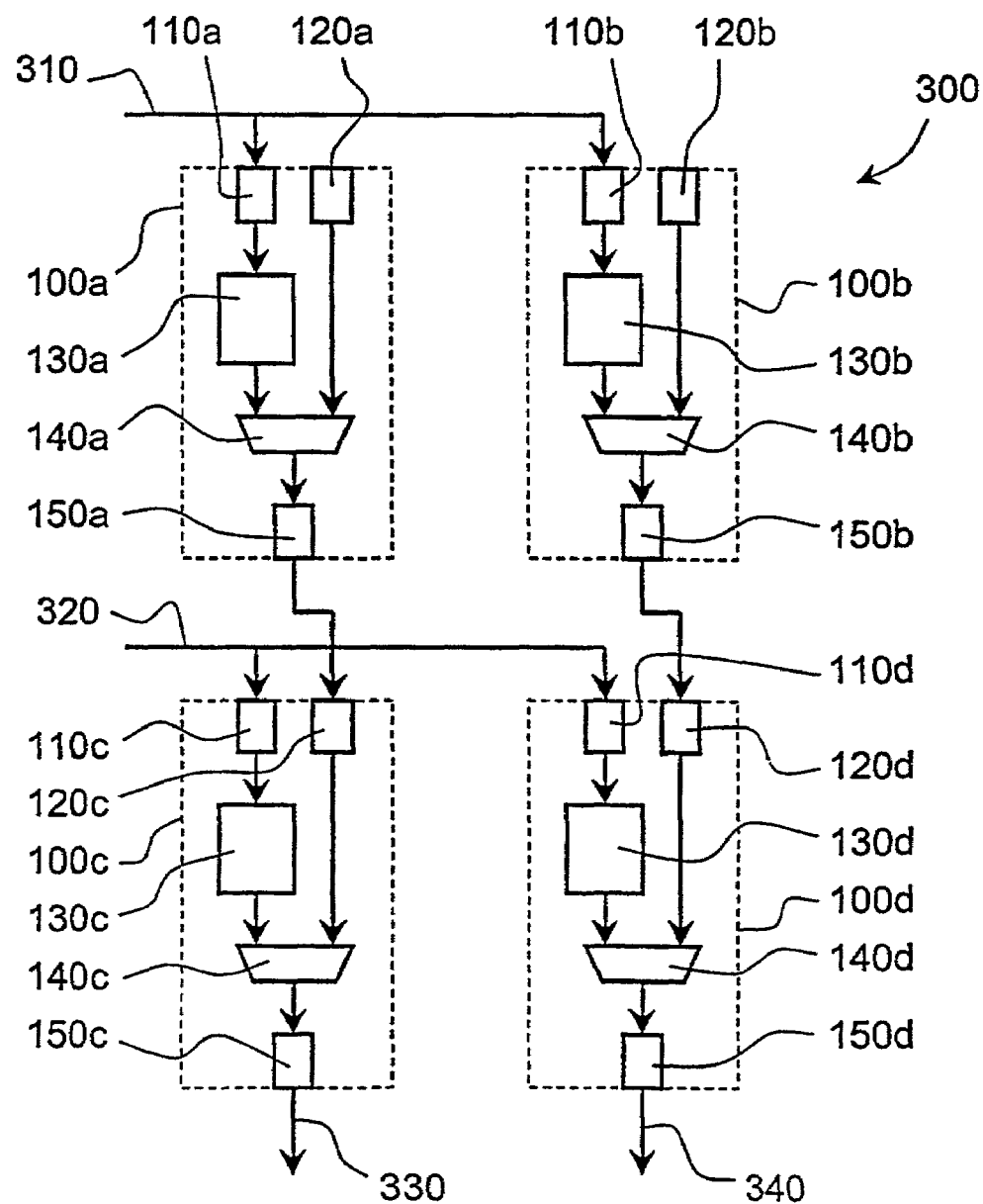
FIG. 3 schematically shows an embodiment of a switch that is built up by interconnected switch elements of the kind shown in FIG. 1.

An exemplifying embodiment of a switch that is built up by interconnected switch elements of the kind described above with reference to FIG. 1 will now be described with reference to FIG. 3. In FIG. 3, the switch 300 is arranged to perform time and space switching from a first 310 and a second 320 input signal to a first 330 and a second 340 output signal, all being assumed to be formed by fixed size frames that are divided into fixed size slots. For that purpose, the switch comprises four switch elements 100a–100d of the kind described above with reference to FIG. 1.

As is illustrated, the first input port 110a of the first switch element 100a and the first input port 110b of the second switch element 100b are connected to receive the first input signal 310. Similarly, the first input port 110c of the third switch element 100c and the first input port 110d of the fourth switch element 100d are connected to receive the second input signal 320.

To cascade the switch elements, the output port 150a of the first switch element 100a is connected to the second input port 120c of the third switch element 100c, and the output port 150b of the second switch element 100b is connected to the second input port 120d of the fourth switch element 100d. To be noted, as the first 100a and second 100b switch elements do not have and cascaded inputs, the second input ports 120a, 120b thereof are not connected to receive any input signals.

The first and second output signals 330 and 340 are thereby provided as the output from the output port 150c of the third switch element 100c and the output port 150d of the fourth switch element 100d.

In the switch 300 of FIG. 3, the time-switching circuit 130a of the first switch element 100a will be configured to perform all time-switching necessary with respect to slots of the first input signal 310 that are to be transmitted in frames of the first output signal 330. Similarly, the time-switching circuit 130b of the second switch element 100b will be configured to perform all time-switching necessary with respect to slots of the first input signal 310 that are to be transmitted in frames of the second output signal 340. The so time-switched frames of the first input signal 310 are then forwarded to the selecting multiplexors 140c and 140d of the third and fourth switch element 100c and 10d, respectively using the cascade input ports 120c and 120d.

In addition, the time-switching circuit 130c of the third switch element 100c will be configured to perform all time-switching necessary with respect to slots of the second input signal 320 that are to be transmitted in frames of the first output signal 330, and the time-switching circuit 130d of the fourth switch element 100d will be configured to perform all time-switching necessary with respect to slots of the second input signal 320 that are to be transmitted in frames of the second output signal 340. The so time-switched frames of the second input signal 320 are thus also forwarded to the selecting multiplexors 140c and 140d of the third and fourth switch element 100c and 100d, respectively.

The selecting multiplexor 140c will then form the first output signal 330 by selecting slots from the first input signal 310 as received via the time-switching circuit 130a and the second input signal 320 as received via the time-switching circuit 130c: Similarly, the selecting multiplexor 140d will form the second output signal 340 by selecting slots from the first input signal 310 as received via the time-switching circuit 130b and the second input signal 320 as received via the time-switching circuit 130d.

Figure 4:
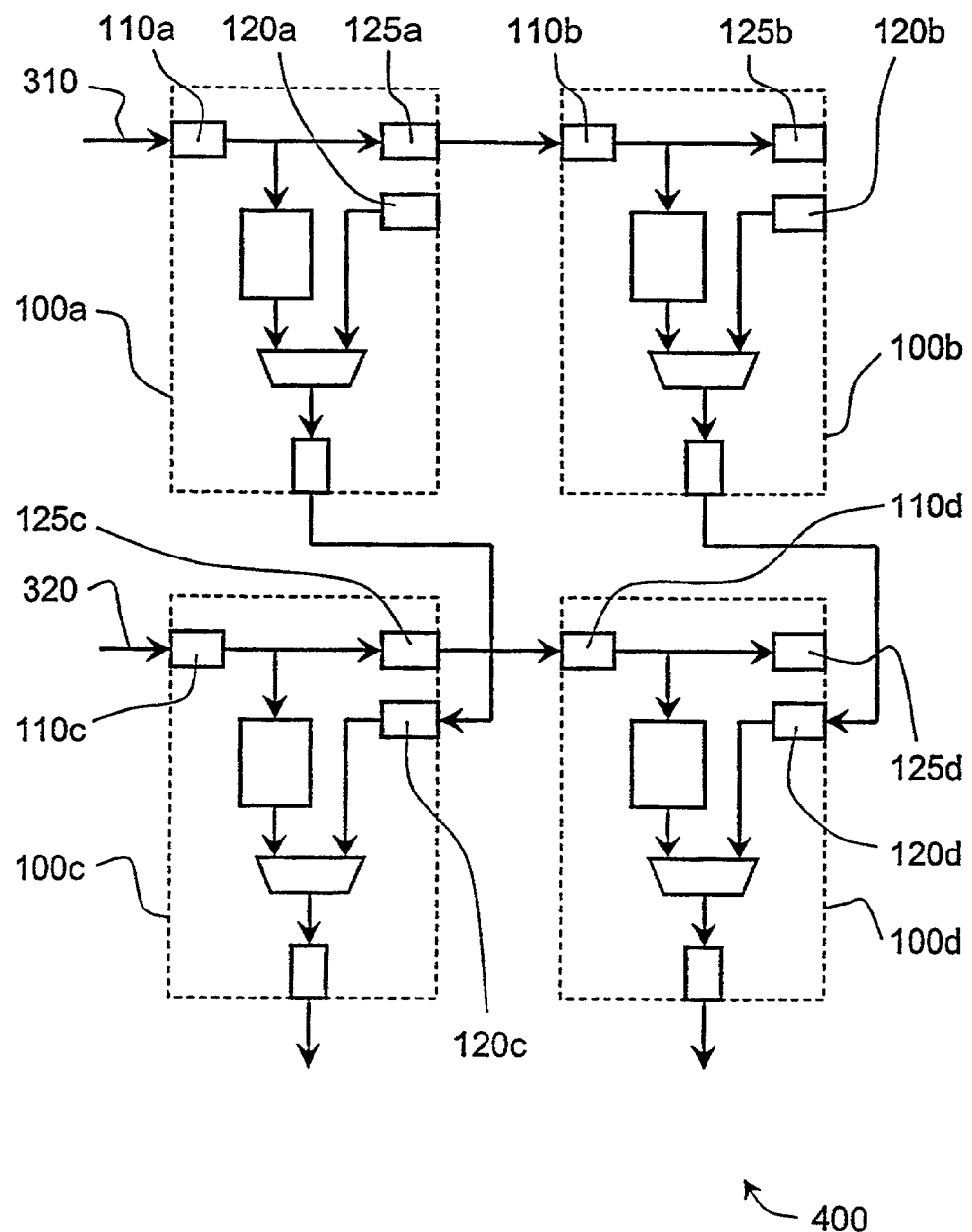
FIG. 4 schematically shows the switch of FIG. 3 according to a modified embodiment.

An alternative embodiment of a switch that is built up by interconnected switch elements of the kind described above with reference to FIG. 1 is shown in FIG. 4. In the switch 400 of FIG. 4, each switch element 100a–100d is provided with a respective so-called repeat port 125a–125d. The repeat port of a switch element has the function of simply forwarding any data that is received via the first input port of the respective element. Then, instead of connecting an input signal (such as the input signal 310 in FIG. 3) directly to first input ports of two different switch element (such as 100a and 100b in FIG. 3), the input signal is only connected to the input port of one of these two elements, the other one of the two elements simply being provided with the input signal by having its first input port connected to the repeat port of the first element.

For example, in FIG. 4, the first input port 10b of the second switch element 100b receives the first input signal 310 by being connected to the repeat port 125a of the first switch element 100a, and the first input port 110d of the fourth switch element 100d receives the second input signal 320 by being connected to the repeat port 125c of the third switch element 100c. To be noted, as the input signals 310 and 320 are in this example not to be forwarded to any switch elements in addition to the ones shown in the figure, the repeat ports of the second 100b and fourth 110d switch elements are in this case not connected to forward any signals to other switch elements. With the exemption of this use of the repeat ports, the design and operation of the switch 400 of FIG. 4 is the same as the design and operation of the switch 300 of FIG. 3.

Figure 5:
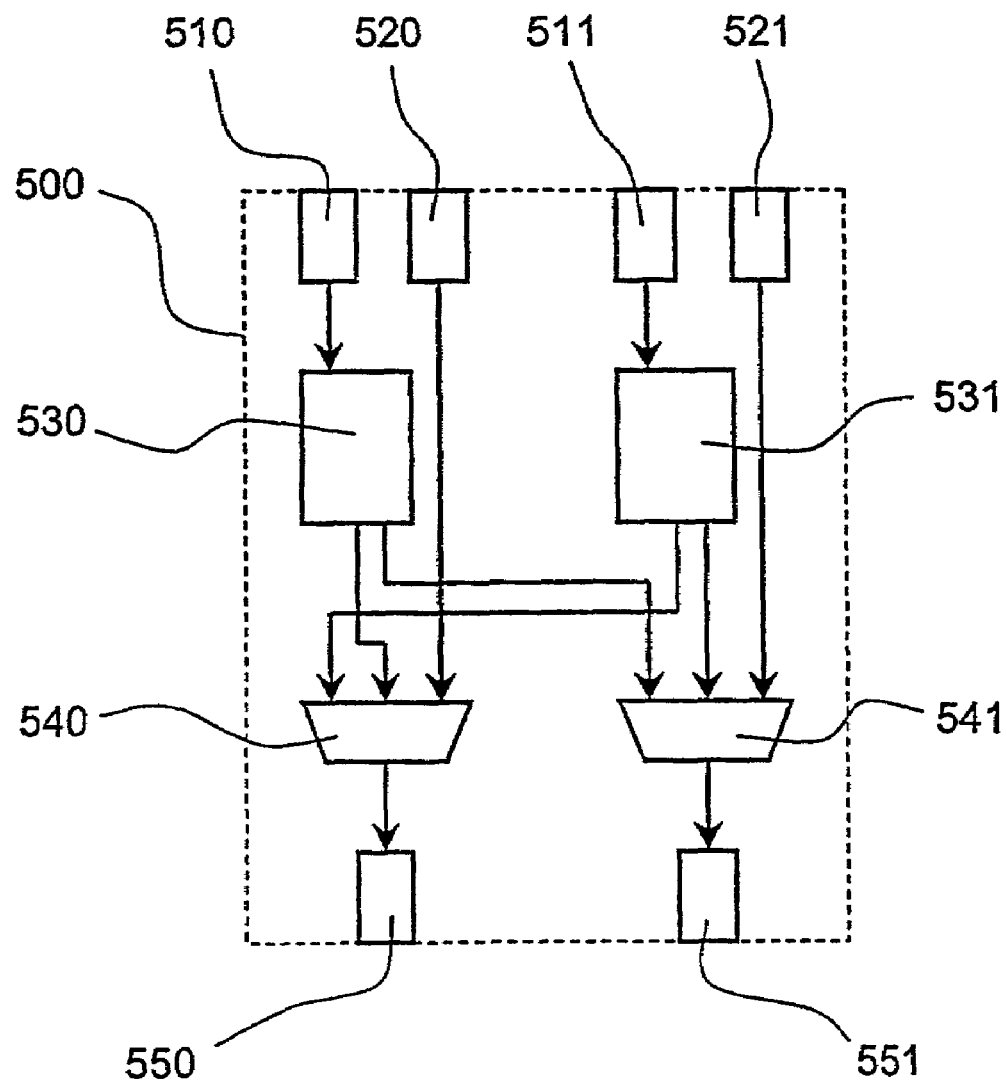
FIG. 5 schematically shows another embodiment of a switch element of the kind used to build larger scale switches according to the invention.

Another exemplifying embodiment of a switch element of the kind used to build larger scale switches according to the invention will now be describe with reference to FIG. 5. In FIG. 5, the switch element 500 comprises a first 510, a second 520, a third 511, and a fourth 521 input port, a first 530 and a second 531 time-and-space-switching circuit, a first 540 and a second 541 selecting multiplexor, and a first 550 and a second 551 output port.

The first switching circuit 530 is arranged to provide for time-and-space-switching of slots of frames received via the first input port, in accordance with time-and-space-switching instructions provided by a switching control unit (not shown), to provide an output frame of slots to the first multiplexor 540, and an output frame of slots to the second multiplexor 541. Similarly, the second switching circuit 531 is arranged to provide for time-and-space switching of slots of frames received via the third input port 511, in accordance with time-and-space-switching instructions provided by a switching control unit (not shown), to also provide an output frame of slots to the first multiplexor 540, and an output frame of slots to the second multiplexor 541. As understood, the design and operation of each one of the time-and-space-switching circuits 530, 531 may be similar to the circuit described above with reference to FIG. 2. For example, the frame memory illustrated in FIG. 2 could simply be provided with an additional read port, output multiplexor and slot selecting mechanism to provide the desired additional output signal.

In parallel, the second 520 and the fourth 521 input port will optionally be connected to forward frames as received directly to the multiplexor 540 and 541, respectively, i.e. with the time sequential order of the slots of each frame maintained.

Each one of the selecting circuits 540, 541 is then arranged to output frames that are to be transmitted from the respective output port 550, 551 by selectively, in accordance with switching instructions provided by a switching control unit (not shown), combining the slots of frames received a) from the circuit 530, b) from the circuit 531, and c) directly from the respective cascade input port 520, 521. For example, in the exemplifying embodiment illustrated in FIG. 5, the selecting circuit 540 is arranged to forward, as the n:th time slot of a frame that is currently forwarded to the output port 550, either the n:th slot of the frame that is currently received from the circuit 530, the n:th slot of the frame that is currently received from the circuit 531, or the n:th slot of the frame that is currently received directly from the input port 520.

Figure 6:
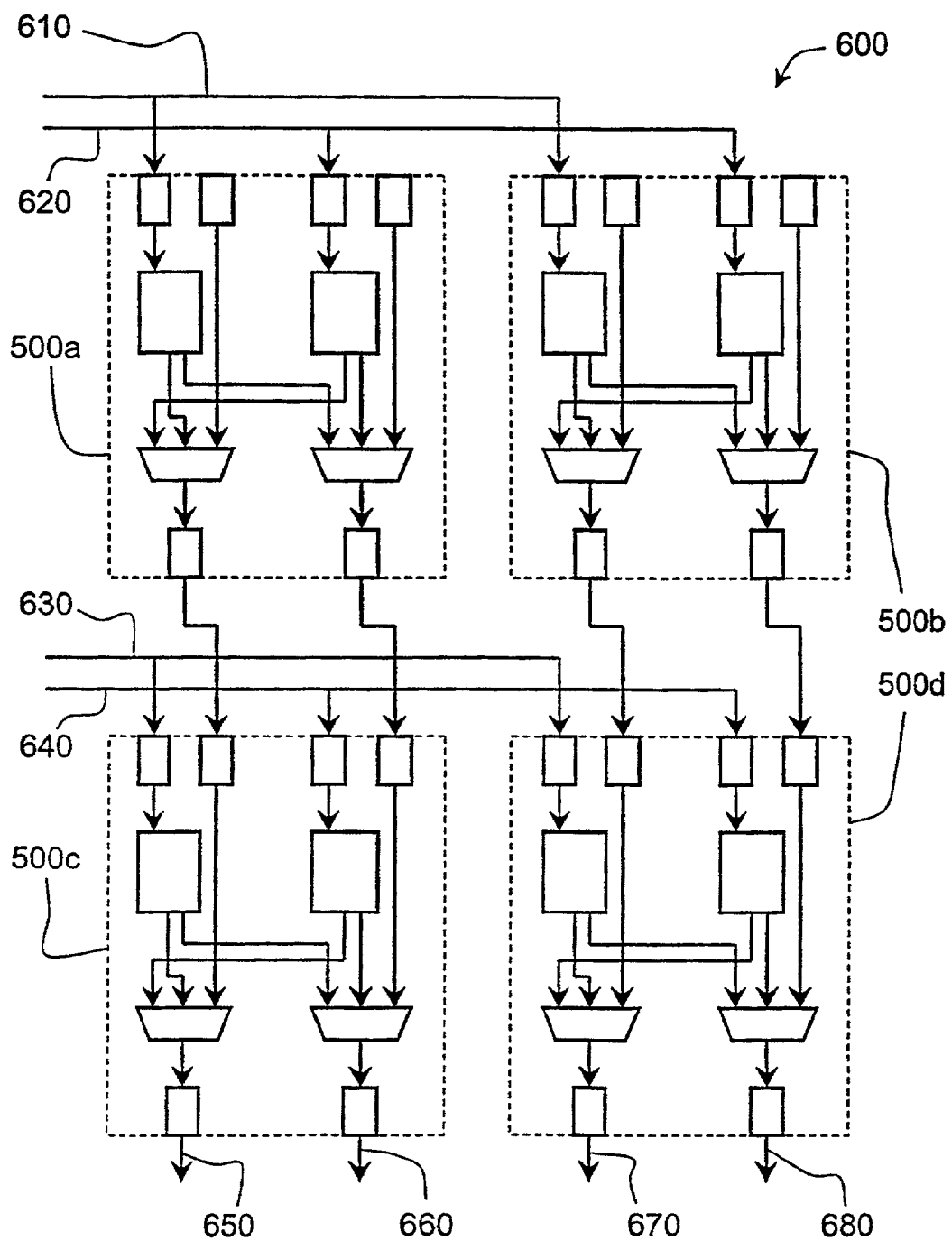
FIG. 6 schematically shows an embodiment of a switch that is built up by interconnected switch elements of the kind shown in FIG. 5.

An exemplifying embodiment of a switch that is built up by interconnected switch elements of the kind described above with reference to FIG. 5 will now be described with reference to FIG. 6. In FIG. 6, the switch 600 is arranged to perform time and space switching from frames of four input signals 610–640 to frames of four output signals 650–680 and comprises said four switch elements 500a–500d of the kind described with reference to FIG. 5.

As shown in FIG. 6, the first input port of the first element 500a and the first input port of the second element 500b are connected to receive the first input signal 610, the third input port of the first element 500a and the third input port of the second element 500b are connected to receive the second input signal 620, the first input port of the third element 500c and the first input port of the fourth element 500d are connected to receive the third input signal 630, and the third input port of the third element 500*a* and the third input port of the fourth element 500*d* are connected to receive the fourth input signal 640.

To cascade the elements 500*a*–500*c* into forming the larger scale switch 600, the first and second output port of the first element 500*a* is connected to the second and fourth input port, respectively, of the third element 500*c*, and the first and second output port of the second element 500*b* is connected to the second and fourth input port, respectively, of the fourth element 500*d*.

The first 650, second 660, third 670 and fourth 680 output signal is thereby provided as the output from the first output port of the third element 500*c*, the second output port of the third element 500*c*, the first output port of the fourth element 500*d*, and the second output port of the fourth switch element 500*d*, respectively.

To exemplify the configuration of the switching and multiplexing circuits of the elements 500*a*–500*c* when switching time slot from frames of the four input signals 610–640 to, for example, the first output signal 650, the first time-and-space-switching circuit of the first switch element 500*a* will be configured to perform all time-switching necessary, with respect to slots of the first input signal 610 that are to be transmitted in frames of the first output signal 650, when providing its output to the first multiplexor of the first switch element 500*a*. Similarly, the second time-and-space-switching circuit of the first switch element 500*a* will be configured to perform all time-switching necessary, with respect to slots of the second input signal 620 that are to be transmitted in frames of the first output signal 650, when providing its output to the first multiplexor of the first switch element 500*a*. The first multiplexor of the first switch element 500*a* will in turn be configured perform all space selection necessary, with respect to slots of the first 610 and the second 620 input signal that are to be transmitted in frames of the first output signal 650, when providing its output to the first cascade input of the third switch element 500*c*.

In the switch element 500*c*, the first time-and-space-switching circuit thereof will be configured to perform all time-switching necessary, with respect to slots of the third input signal 630 that are to be transmitted in frames of the first output signal 650, when providing its output to the first multiplexor. Similarly, the second time-and-space-switching circuit of the third switch element 500*c* will be configured to perform all time-switching necessary, with respect to slots of the fourth input signal 640 that are to be transmitted in frames of the first output signal 650, when providing its output to the first multiplexor of the third switch element 500*c*. Finally, the first multiplexor of the third switch element 500*a* will be configured to perform all space selection necessary among frames received from the first switching circuit (referring to input signal 630), the second switching circuit (referring to input signal 640), and the clustered input port (referring to input signals 610 and 620) to provide the desired output signal 650.

Figure 7A:
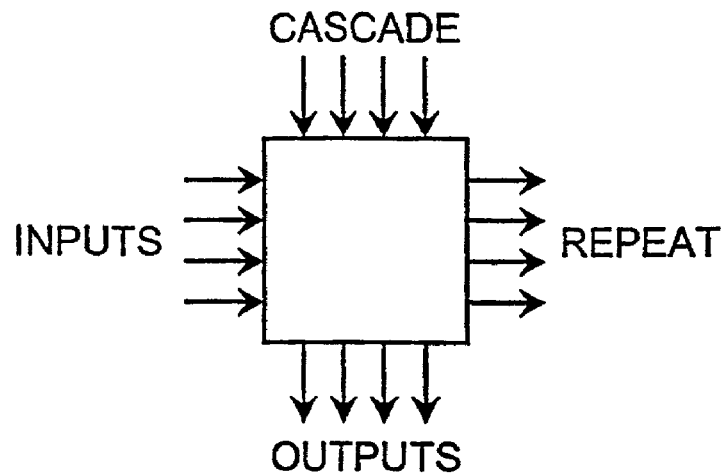
FIGS. 7A and 7B schematically shows sixteen 4×4 switch elements that are combined into forming a 16×16 switch.
Figure 7B:
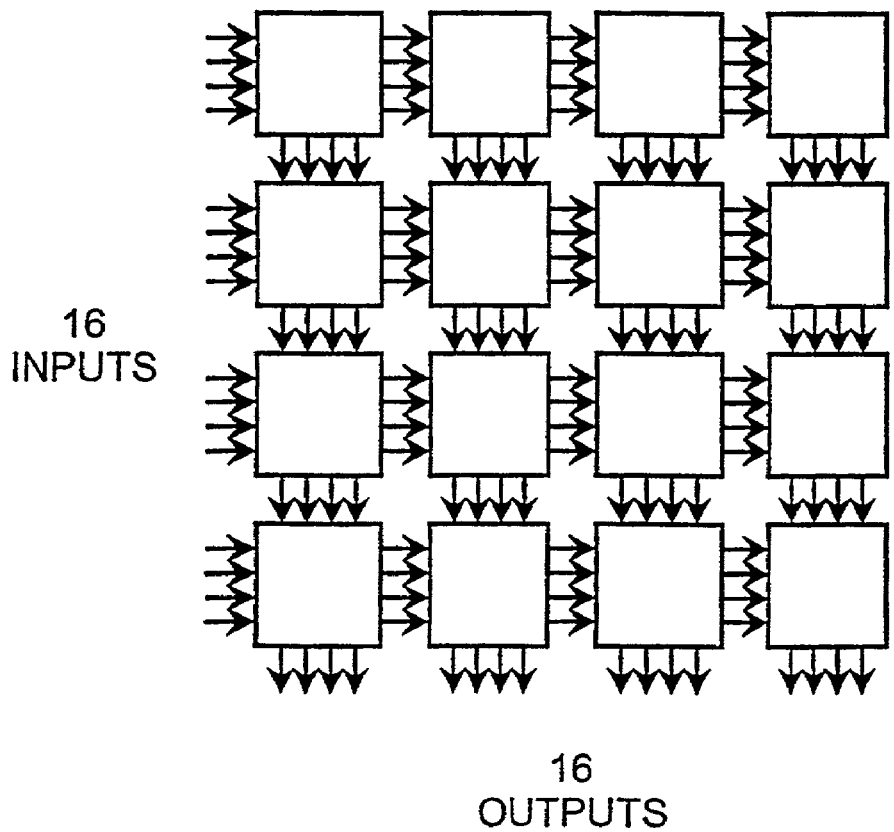

To further illustrate the cascading possibilities provided by the invention, FIG. 7A illustrate a 4×4 switch element, sixteen of which having been combined in FIG. 7B into forming a 16×16 switch.

As is shown in FIG. 6A, the switch element has four signal inputs, four signal outputs, four cascade inputs and four repeat outputs. The design and operation of this switch element could for example be similar to the design and operation of the element 500 described above with reference to FIG. 5 by merely adding thereto two additional input port pairs, two switching circuits, two multiplexors, and two output ports, and by providing each one of the then four switching circuits of the element with the capability of providing frames of time switched slots to all four multiplexors of the element, each multiplexor thus selecting time slots among frames provided by the four switching circuits and a respective one of the cascade input ports.

To be understood, even though the invention primarily addresses so-called symmetric or quadratic switch element configurations, for example as illustrated in FIGS. 3, 7, and 7B, also asymmetric switch element configurations can be envisaged.

Even though exemplifying embodiment of the invention has been described in detail above, modifications, combinations and alterations thereof may be made, as will be clear to those skilled in the art, within the scope of the invention, which is defined by the accompanying claims.

The invention claimed is:

1. An apparatus for time and space switching data from a first and a second input signal to a first and a second output signal, said apparatus comprising at least four switch elements (100; 500), each having a first (110; 510) and a second (120; 520) input port and an output port (150; 550) and comprising:
   switching means (130; 530) arranged to provide for time-switching of data received from said first input port to provide an output referring to said output port; and
   selecting means (140; 540) for defining a signal to be outputted from said output port by selectively combining said output from said switching means and data received via said second input port, mutual order of said data received via said second input port being the same when incorporated into said signal as when received via said first input port,
   wherein said elements are arranged so that:
      the first input port of a first one of said switch elements and the first input port of a second one of said switch elements are connected to receive said first input signal;
      the first input port of a third one of said switch elements and the first input port of a fourth one of said switch elements are connected to receive said second input signal;
      the output port of said first switch element is connected to the second input port of said third switch element;
      the output port of said second switch element is connected to the second input port of said fourth switch element; and
      the output ports of said third switch element and said fourth switch element thereby provides said first and second output signal, respectively.

2. An apparatus as claimed in claim 1, wherein the second input port of said first switch element and the second input port of said second switch element are not connected to receive any signals.

3. An apparatus as claimed in claim 1, wherein each one of said elements is arranged to receive data in essentially equally sized frames via at least one of the input ports of the respective element and to output data in essentially equally sized frames at the output port of the respective element.

4. An apparatus as claimed in claim 1, wherein said data is transferred in fixed size time slots.

5. An apparatus as claimed in claim 1, wherein the output from said switching means, and said data from said input port, to said selecting means is provided in frames.

6. An apparatus as claimed in claim 1, wherein said selecting means is arranged to select, for each time slot to be outputted from said output port, either a time slot received from said switching means or a time slot received from said second input port.

7. An apparatus claimed in claim 1, wherein said selecting means is arranged, when selecting the n:th slot of a frame to be outputted from said output port, to select either the n:th slot of a frame received from said switching means or the n:th slot of a frame received from said second input port.

8. An apparatus as claimed in any one of the preceding claims, wherein each one of said switch elements comprises an additional output port (125), wherein data received at the first input port (110) of the respective element is transmitted from said additional output port as received at said first input port, and wherein:
   the first input port of said second switch element is connected to receive said first signal by being connected to the additional output port of said first switch element; and
   the first input port of said fourth switch element is connected to receive said second signal by being connected to the additional output port of said third switch element.

9. An apparatus for time and space switching data from four or more input signals to four or more output signals, said apparatus including at least four switch elements (500), each having at least four input ports and at least two output ports and comprising:
   first switching means (530) arranged to provide for time-and-space-switching of data received from a first one (510) of said input ports to provide an output referring to a first one (550) of said output ports as well as an output referring to a second one (551) of said output ports;
   second switching means (531) arranged to provide for time-and-space-switching of data received from a third one (511) of said input ports to provide an output referring to said first output port (550) as well as an output referring to said second output port (551);
   first selecting means (540) for defining a signal to be outputted from said first output port (550) by selectively combining the output from said first switching means (530) that refers to said first output port (550), the output from said second switching means (531) that refers to said first output port (550), and data received via a second one (520) of said input ports, mutual order of said data received via said second port being the same when incorporated into said signal as when received via said input port; and
   second selecting means (541) for defining a signal to be outputted from said second output port (551) by selectively combining the output from said first switching means (530) that refers to said second output port (551), the output from said second switching means (531) that refers to said second output port (551), and data received via a fourth one (521) of said input ports, mutual order of said data received via said fourth port being the same when incorporated into said signal as when received via said fourth input port,
   wherein said elements are arranged so that:
      the first input port of a first one of said switch elements and the first input port of a second one of said switch elements are connected to receive a first one of said input signals;
      the third input port of said first switch element and the third input port of said second switch element are connected to receive a second one of said input signals;
      the first input port of a third one of said switch elements and the first input port of a fourth one of said switch elements are connected to receive a third one of said input signals;
      the third input port of said third switch element and the third input port of said fourth switch element are connected to receive a fourth one of said input signals;
      the first and second output port of said first switch element is connected to the second and fourth input port, respectively, of said third switch element;
      the first and second output port of said second switch element is connected to the second and fourth input port, respectively, of said fourth switch element;
      the first and second output port of said third switch element thereby provides a first and a second one, respectively, of said four or more output signals and the first and second output port of said fourth switch element thereby provides a third and a fourth one, respectively, of said four or more output signals.

10. An apparatus as claimed in claim 9, wherein the second and fourth input port of said first switch element and the second and fourth input port of said second switch element are not connected to receive any signals.

* * * * *